United States Patent
Childers et al.

(10) Patent No.: US 7,164,451 B2
(45) Date of Patent: Jan. 16, 2007

(54) PROJECTOR HAVING SCANNING OPTICS

(75) Inventors: Winthrop D. Childers, San Diego, CA (US); Wayne M. Richard, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 613 days.

(21) Appl. No.: 10/419,321

(22) Filed: Apr. 19, 2003

(65) Prior Publication Data

US 2003/0206250 A1 Nov. 6, 2003

Related U.S. Application Data

(63) Continuation of application No. 10/138,765, filed on May 3, 2002.

(51) Int. Cl.
*H04N 3/223* (2006.01)
*H04N 5/74* (2006.01)

(52) U.S. Cl. .................... 348/747; 348/756

(58) Field of Classification Search ........... 348/745, 348/744, 750, 754, 759, 801, 747, 756, 201; 359/204, 205, 212, 213, 216, 217, 220
See application file for complete search history.

(56) References Cited

U.S. PATENT DOCUMENTS

| | | | |
|---|---|---|---|
| 5,715,021 A | 2/1998 | Gibeau et al. | |
| 5,818,546 A | 10/1998 | Opower et al. | |
| 5,874,929 A | 2/1999 | Opower et al. | |
| 5,920,361 A | 7/1999 | Gibeau et al. | |
| 5,971,545 A | 10/1999 | Haitz | |
| 5,997,150 A | 12/1999 | Anderson | |
| 6,109,750 A | 8/2000 | Mayer et al. | |
| 6,170,953 B1 | 1/2001 | Lee et al. | |
| 6,175,440 B1 * | 1/2001 | Conemac | 359/204 |
| 6,195,184 B1 | 2/2001 | Chao et al. | |
| 6,224,216 B1 | 5/2001 | Parker et al. | |
| 6,583,912 B1 * | 6/2003 | Van Lerberghe | 359/204 |

FOREIGN PATENT DOCUMENTS

| WO | WO 98/24240 | 6/1998 |
|---|---|---|
| WO | WO 02/21850 | 3/2002 |

* cited by examiner

*Primary Examiner*—Michael H. Lee

(57) ABSTRACT

A projector that employs scanning optics is disclosed. A number of light-emitting sources have intensities that are varied in accordance with an image. The scanning optics scan the light output by the light-emitting sources to cover a two-dimensional plane in accordance with an image.

19 Claims, 9 Drawing Sheets

PROJECTOR HAVING SCANNING OPTICS

This is a continuation of copending application Ser. No. 10/138,765 filed on May 3, 2002, which is hereby incorporated by reference herein.

BACKGROUND OF THE INVENTION

Projectors are generally devices that integrate light sources, optics systems, electronics, and displays for projecting images from computers or video devices onto walls or screens, for large-image viewing. They are especially popular among business users who give presentations as part of their job responsibilities. Newer projectors can weigh as little as a few pounds, making them well suited for business travelers. As the quality of projection technology has improved, projectors are also finding their way into peoples' homes for high-definition television (HDTV) and other home entertainment applications. Some industry pundits predict that digital projectors will also become the standard projection technology used in movie theaters.

Typical projectors include spatial light modulators (SLM's) to modulate light spatially, so that images are projected onto screens for viewing. Light is transmitted, usually as one or more beams, to an SLM, which processes the light so that the desired image is projected onto a screen. Historically, SLM's have been transmissive in nature. Light is transmitted through an SLM, which modifies the light in accordance with the image to be projected onto the screen. An example of this type of SLM is a liquid crystal display (LCD). However, transmissive SLM's are disadvantageous in that the resulting projected images are dim, due to the light having to travel through the SLM's.

More recently, SLM's have been reflective in nature. Light is reflected off an SLM, which modifies the light in accordance with the image to be projected onto the screen. The archetypical example of this type of SLM is the digital micromirror device (DMD), and projectors that employ such SLM's are known as digital light processing (DLP) projectors. DLP projectors project brighter images, because the light does not have to transmit through the reflective SLM's. However, reflective SLM's are expensive devices, resulting in less-than-widespread usage of DLP projectors. For these and other reasons, therefore, there is a need for the present invention.

SUMMARY OF THE INVENTION

The invention relates to a projector that employs scanning optics. A number of light-emitting sources have intensities varied in accordance with an image. The scanning optics scan the light output by the light-emitting sources to cover a two-dimensional plane in accordance with an image.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

Figure 1:
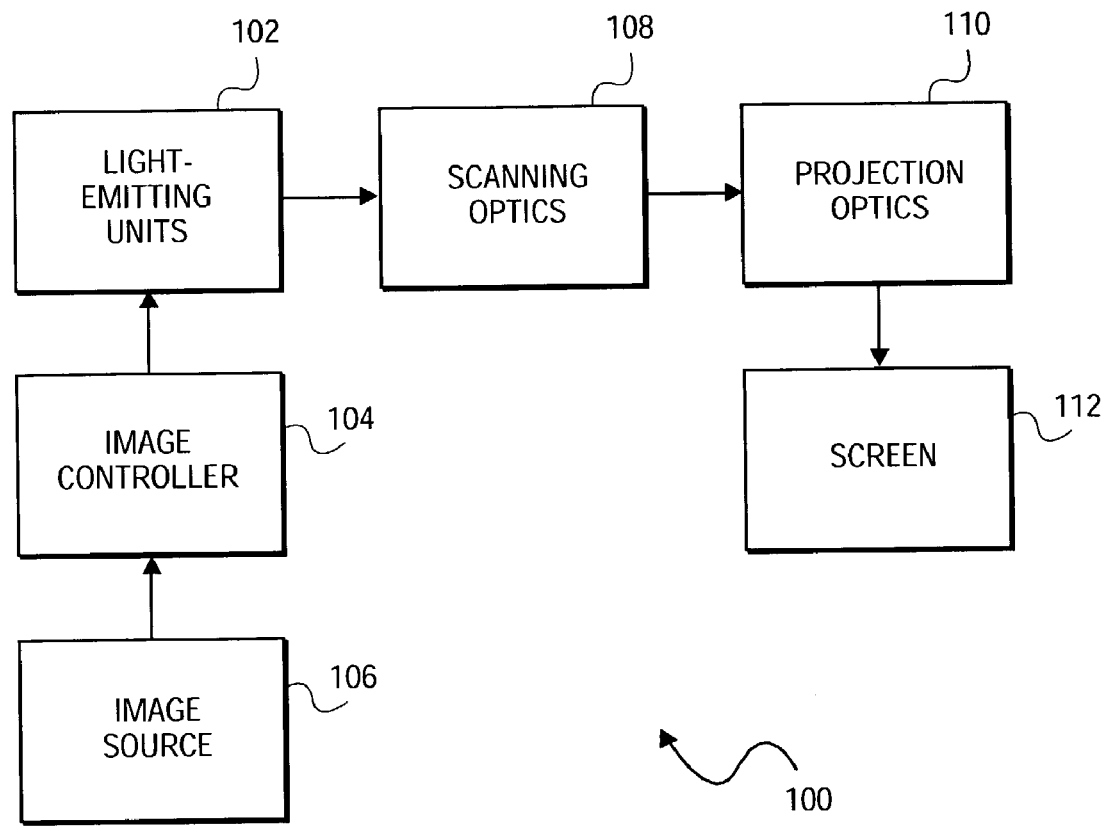
FIG. 1 is a block diagram of a general projection system according to an embodiment of the invention that includes scanning optics.

FIG. 1 shows a block diagram of a projection system 100 according to an embodiment of the invention. The system 100 may be implemented as a projector. The projection system 100 includes light-emitting units 102, an image controller 104, and an image source 106. The system 100 also includes scanning optics 108, projection optics 110, and a screen 112. The light-emitting units 102 preferably include light-emitting sources, such as light-emitting diodes (LED's), lasers, or other light-emitting sources. The image controller 104 individually turns the light-emitting units 102 on and off in accordance with an image output by the image source 106. For example, the light-emitting units 102 may include red light-emitting units, green light-emitting units, and blue light-emitting units. By varying their intensity, which is inclusive of and encompasses just turning them on and off, the controller 104 ensures that the light units 102 generate light having a color as prescribed by the image output by the image source 106. That is, turning the light-emitting units on and off is encompassed by the phrase varying the intensities of the light-emitting units. The image source 106 may be a computer, a video device, and so on, whereas the image may be a still image or a moving image.

The scanning optics 108 scan the light output by the light-emitting units 102 to cover a two-dimensional plane, such as the screen 112, in accordance with the image output by the image source 106. The term scan as used herein can generally and non-restrictively mean the movement of light, such as the movement of a light beam, across the two-dimensional plane in a systematic manner so that the light ultimately covers the entire plane in accordance with the image. For example, in one embodiment, the two-dimensional plane can be divided into sub-regions that are individually scanned line-by-line by different of the light-emitting units 102 so the entire two-dimensional plane is covered. As another example, in another embodiment, the light output by the light-emitting units 102 is organized substantially along one of the two dimensions of the plane, so that scanning along the other dimension covers the entire two-dimensional plane. Each of these approaches is described in more detail in subsequent sections of the detailed description.

The scanning of the light output by the light-emitting units 102 to cover a two-dimensional plane, and thus the employment of the scanning optics 108 to perform such scanning, preferably obviate the need for using a spatial light modulator (SLM) within the projection system 100. That is, rather than having a SLM transmit or reflect light in accordance with an image, the projection system 100 according to an embodiment of the invention turns the light output by the light-emitting units 102 on and off as the light is scanned over the two-dimensional plane. The preferred elimination of the SLM means that implementing the projection system 100 according to an embodiment of the invention is cost advantageous as compared to implementing prior art projection systems, among other advantages.

The projection optics 110 projects the light scanned by the scanning optics 108 in accordance with the image outward towards the screen 112. The scanning optics 108 and the projection optics 110 may be positioned relative to one another in a different order than that shown in FIG. 1. For example, the light output by the light-emitting units 102 may first pass through the projection optics 110 before being scanned by the scanning optics 108. Likewise, other components of the system 100 may be positioned differently than as indicated in FIG. 1.

First Specific Embodiment

Figure 2A:
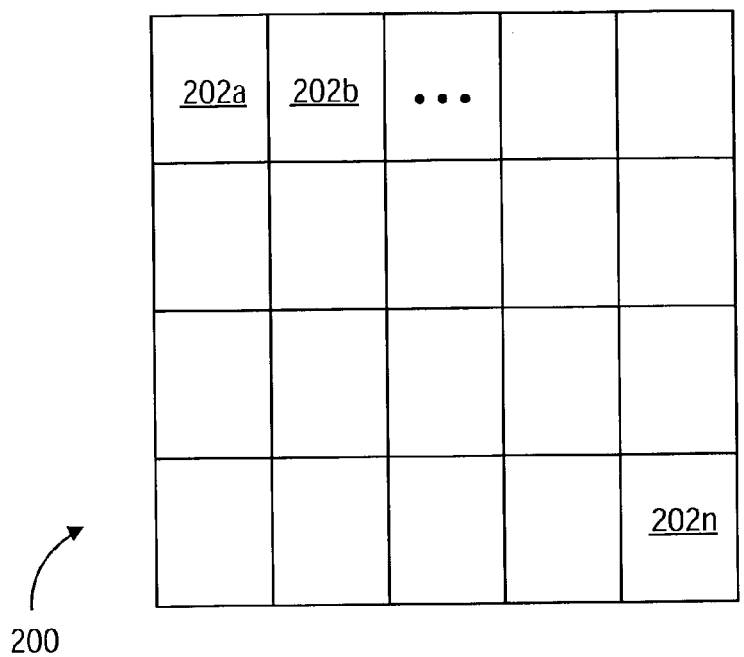
FIGS. 2A and 2B are diagrams illustrating different manners by which a two-dimensional plane is divided into individually scanned sub-regions, according to varying embodiment of the invention.
Figure 2B:
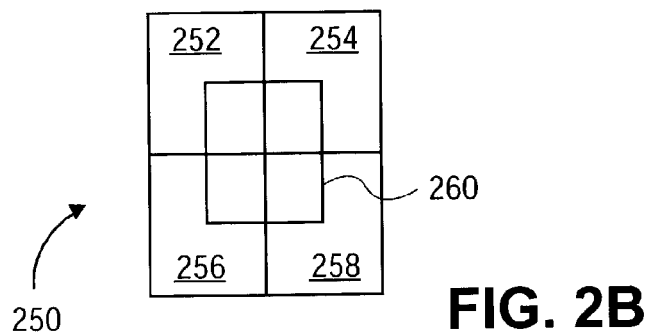

In one specific embodiment of the invention, the light-emitting units 102 of the projection system 100 of FIG. 1 are divided into a number of groups, and the light of each group is scanned by the scanning optics 108 over a different sub-region of a two-dimensional plane, such as the screen 112. That is, each group is responsible for covering a corresponding sub-region of the two-dimensional plane. FIGS. 2A and 2B show the manner by which a two-dimensional plane may be divided into different sub-regions according to varying embodiments of the invention. In FIG. 2A, the two-dimensional plane 200 is divided into a number of non-overlapping sub-regions 202a, 202b, . . . , 202n.

By comparison, in FIG. 2B, a portion 250 of a two-dimensional plane is shown in which there are overlapping sub-regions 252, 254, 256, 258, and 260. In particular, the sub-regions 252, 254, 256, and 258 overlap the sub-region 260. The use of overlapping sub-regions may be desirable where one or more of the light-emitting units of the projection system may fail, so that the resulting image projected onto the screen does not have a blank sub-region corresponding to the failed light-emitting unit. Furthermore, organizational schemes for overlapping sub-regions may differ than that shown in FIG. 2B, and the manner by which the sub-regions 252, 254, 256, 258, and 260 of FIG. 2B overlap is only one example of such an organizational scheme.

Figure 3:
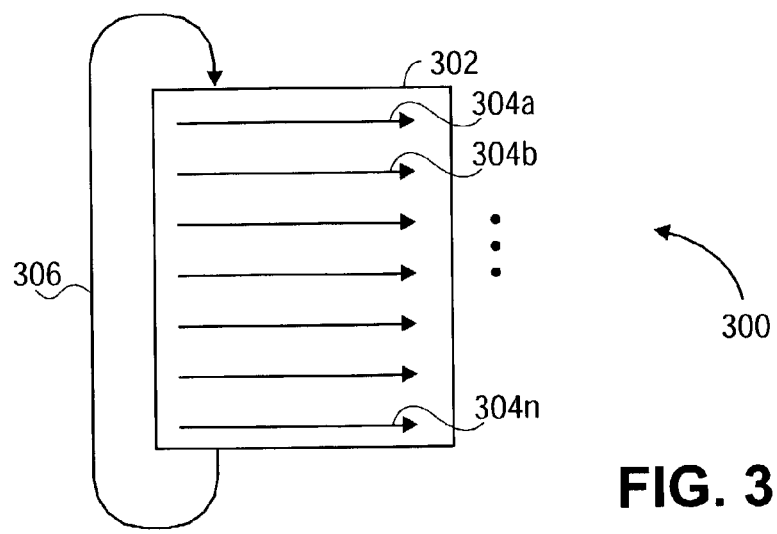
FIG. 3 is a diagram showing how a light beam scans a corresponding sub-region of a two-dimensional plane, according to an embodiment of the invention.

FIG. 3 shows a diagram 300 as to how the light emitted by a given light-emitting unit, such as a light beam emitted thereby, scans a corresponding sub-region 302 of a two-dimensional plane, according to an embodiment of the invention. The light individually scans horizontal scan lines 304a, 304b, . . . , 304n from left to right. For example, first the light scans the scan line 304a from left to right, then the horizontal line 304b, and so on, until the scan line 304n is reached. Once the horizontal line 304n has been scanned, the process repeats, as indicated by the arrow 306. As the light scans each line, the light-emitting sources that make up the light-emitting unit are turned on and off in accordance with an image, so that the image is properly projected.

Figure 4:
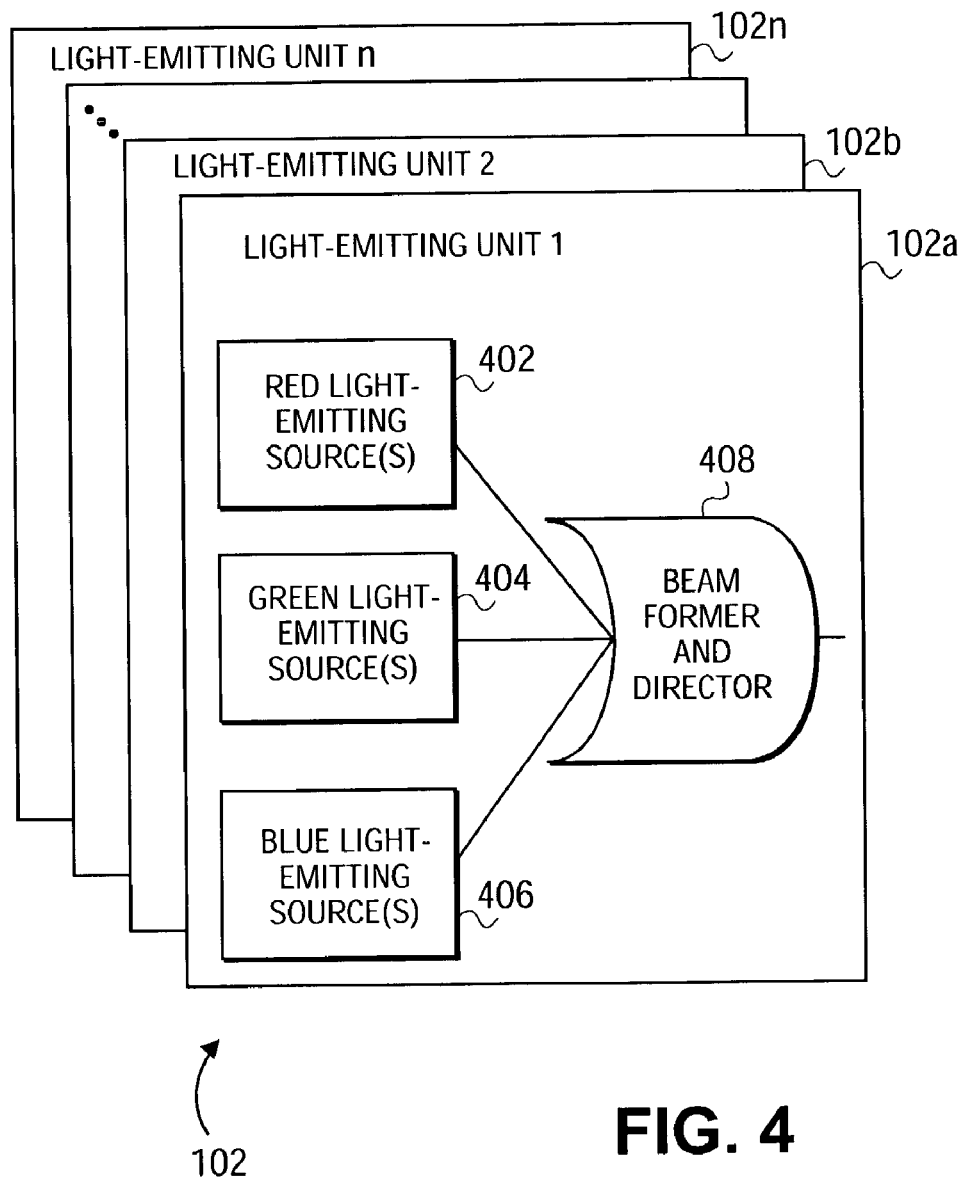
FIG. 4 is a diagram of the light-emitting units of FIG. 1 according to an embodiment of the invention in which light beams scan corresponding sub-regions of a two-dimensional plane.

FIG. 4 shows in more detail the light-emitting units 102 of the projection system 100 of FIG. 1, according to an embodiment of the invention in which the light output by each of the light-emitting units 102 is responsible for covering a corresponding two-dimensional sub-region. The light-emitting units 102 include the light-emitting units 102a, 102b, . . . , 102n. The light-emitting unit 102a is specifically shown in detail, although the other light-emitting units 102b, . . . , 102n are similarly implemented. The light-emitting unit 102a includes one or more red light-emitting sources 402, one or more green light-emitting sources 404, and one or more blue light-emitting sources 406, emitting red light, green light, and blue light, respectively. The sources 402, 404, and 406 may be red LED's, green LED's, and blue LED's, respectively. The light output by these sources 402, 404, and 406 is output to a beam former and director 408, which forms and directs a light beam composed of one or more of red light, green light, and blue light.

This light beam is thus what the scanning optics 108 of the projection system 100 of FIG. 1 scans over the two-dimensional sub-region corresponding to the light-emitting unit 102a. The image controller 104 of the projection system 100 of FIG. 1 turns the light sources 402, 404, and 406 on and off in accordance with the image being provided by the image source 106 of the projection system 100 of FIG. 1, and more generally varies their intensity, as the scanning optics 108 scans the beam over the corresponding sub-region. As a result, the part of the image corresponding to this sub-region is projected onto the screen 112 of the projection system 100 of FIG. 1. The scanning of the other sub-regions by the scanning optics 108 of the light beams output by the other light-emitting units 102b . . . 102n, in addition to the scanning of the light beam output by the light-emitting unit 102a, results in the entire image being projected onto the screen 112.

Figure 5A:
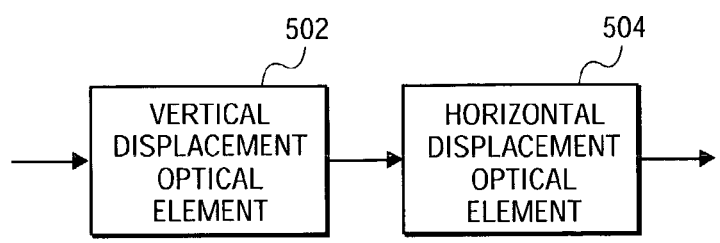
FIGS. 5A and 5B are diagrams of the scanning optics of FIG. 1 according to an embodiment of the invention in which light beams scan corresponding sub-regions of a two-dimensional plane.
Figure 5B:
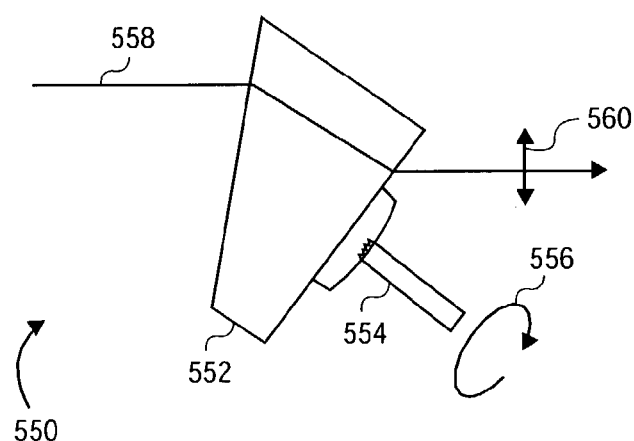

FIGS. 5A and 5B show in increasing levels of detail the scanning optics 108 of the projection system 100 of FIG. 1, according to an embodiment of the invention in which the light output by each of the light-emitting units 102 is responsible for covering a corresponding sub-region of a two-dimensional plane. In FIG. 5A, the scanning optics 108 includes a vertical displacement optical element 502 and a horizontal displacement optical element 504, according to an embodiment of the invention. The vertical displacement optical element 502 moves the light beam output by one of the light-emitting units 102 vertically, whereas the horizontal displacement optical element 504 moves the light output by this light-emitting unit horizontally.

Preferably, in this embodiment, the vertical displacement optical element 502 moves the light beam vertically after the horizontal displacement optical element 504 has completely scanned the light beam at least substantially horizontally over a corresponding sub-region. That is, the light beam output by a light-emitting unit scans a line of its corresponding sub-region horizontally by the horizontal displacement optical element 504 before the vertical displacement optical element 502 causes the light beam to beginning scanning the next line of the sub-region. The scanning optics 108 may include elements 502 and 504 for each of the light-emitting units 102, or the same elements 502 and 504 may be shared for a number of the light-emitting units 102, including potentially all the units 102.

The optical elements 502 and 504 can be implemented in a variety of different ways, as lenses, mirrors, as well as other types of transmissive and reflective elements. In FIG. 5B, one example implementation is shown. Specifically, a displacement prism unit 550 is shown according to an embodiment of the invention that can individually implement either or both of the vertical and the horizontal displacement optical elements 502 and 504 of FIG. 5A. The prism unit 550 specifically includes a refractive prism 552 that is trapezoidal in cross-sectional shape and that is mounted to a base 554 that rotates into the plane of FIG. 5B, as indicated by the arrow 556. The light beam 558 is incident to the refractive prism 552 at a varying angle. The angle varies because of the trapezoidal cross-sectional shape of the refractive prism 552. As a result, the light beam 558 moves up and down or back and forth, depending on the positioning of the prism unit 550, as indicated by the arrow 560.

Where the prism unit 550 implements each of the optical elements 502 and 504, the prism unit 550 implementing the vertical displacement optical element 502 preferably rotates at rate of a predetermined number of times slower than the rate at which the prism unit 550 implementing the horizontal displacement optical element 504 rotates. The ratio of the rotation rate of the horizontal displacement optical element 504 to the rotation rate of the vertical displacement optical element 502 is preferably equal to the number of horizontal scan lines of the sub-region that the light beam scanned by the scanning optics 108 covers. This ratio can be accomplished by appropriately gearing the optical elements 502 and 504 together, or by another approach. It is noted that utilizing the prism unit 550 of FIG. 5B to implement each of the optical elements 502 and 504 of FIG. 5A results in substantially, but not perfectly, horizontal scan lines being scanned. This is because the vertical displacement optical element 502 vertically moves the light beam down as the horizontal displacement optical element 504 moves the light beam across, as can be appreciated by those of ordinary skill within the art.

Second Specific Embodiment

In another specific embodiment of the invention, the light-emitting units of the projection system 100 of FIG. 1 output light that is organized substantially along a first dimension of a two-dimensional plane, such as the screen 112, and the scanning optics 108 scan the light over the other dimension of the plane. This is shown particularly in the diagram 600 of FIG. 6A. The light 604 output by the light-emitting units is organized substantially along the vertical dimension of the two-dimensional plane 602. The scanning optics scans the light 604 over the horizontal dimension of the plane 602, as indicated by the arrow 606. As the scanning occurs, the individual light beams making up the light 604, which are not specifically shown in FIG. 6A, are turned on and off, and their intensity optionally varied, by an image controller in accordance with an image output by an image source so that the image is properly projected.

Figure 6A:
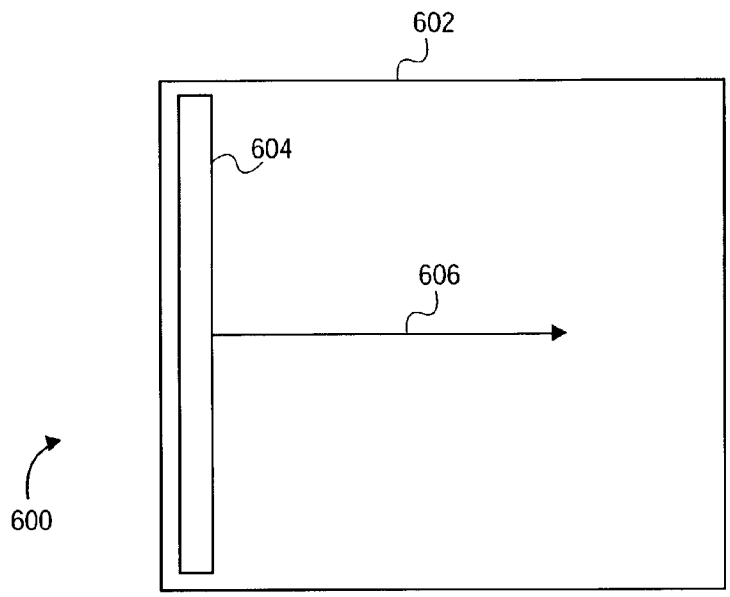
FIG. 6A is a diagram illustrating the manner by which a two-dimensional plane is scanned by light beams organized substantially along a vertical dimension of the plane, according to an embodiment of the invention.
Figure 6B:
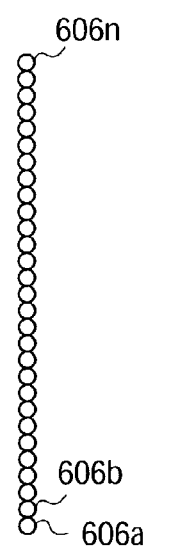
FIGS. 6B, 6C, and 6D are diagrams showing different manners by which light beams are organized substantially along a vertical dimension of a two-dimensional plane, according to varying embodiments of the invention.
Figure 6C:
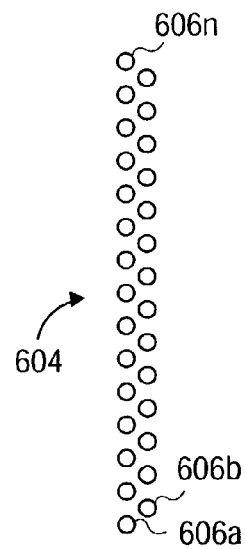
Figure 6D:
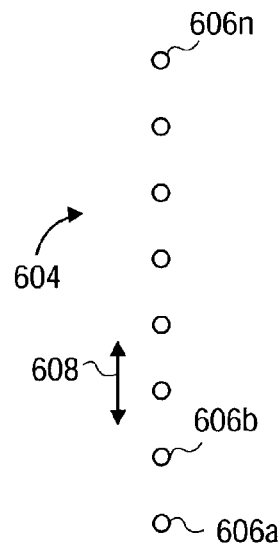

FIGS. 6B, 6C, and 6D show different manners by which the light 604 of FIG. 6A may be organized substantially along one of the two dimensions of the plane 602. In FIG. 6B, the light 604 is made up of a number of light beams 606a, 606b, . . . 606n. The light beams 606a, 606b, . . . , 606n are organized in a columnar configuration where each light beam is vertically aligned relative to the other light beams. By comparison, in FIG. 6C, the light beams 606a, 606b, . . . , 606n of the light 604 are organized in a staggered formation over two vertical columns. It is still said, however, that the light beams are organized substantially along one of the dimensions of the plane 602 of FIG. 6A. The light beams of the first column have gaps therebetween that overlap with the light beams of the second column and the light beams of the second column have gaps therebetween that overlap with the light beams of the first. This allows for greater resolution in the resulting projected image as compared to the formation of the light beams in FIG. 6B.

In FIG. 6D, the light beams 606a, 606b, . . . , 606n of the light 604 are organized in a sparse columnar configuration, where each light beam is vertically aligned relative to the other light beams, as in FIG. 6B. However, unlike the configuration of FIG. 6B, the configuration of FIG. 6D has relatively large gaps between the individual light beams. Therefore, to achieve a desired resolution, as the light 604 scans across the plane 602 of FIG. 6A, the light beams 606a, 606b, . . . 606n are rapidly moved in unison vertically, as indicated by the arrow 608, so that the gaps between the individual light beams are covered. The advantage to the configuration of FIG. 6D as compared to those of FIGS. 6B and 6C is that less light beams, and hence less light-emitting units, are needed, which can be cost effective.

Figure 7A:
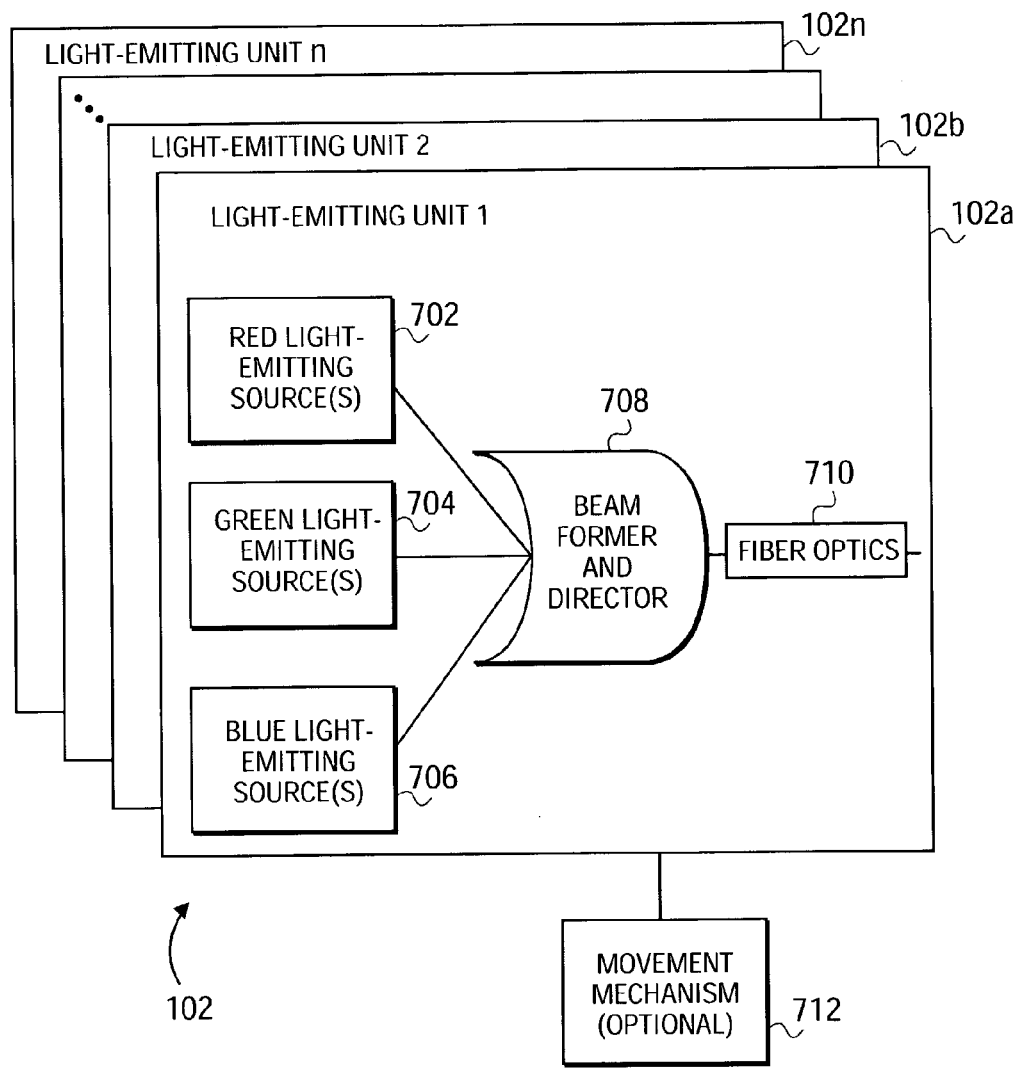
FIGS. 7A and 7B are diagrams of the light-emitting units of FIG. 1 according to varying embodiments of the invention in which light beams are organized substantially along a vertical dimension of a two-dimensional plane and scan the plane along a horizontal dimension.
Figure 7B:
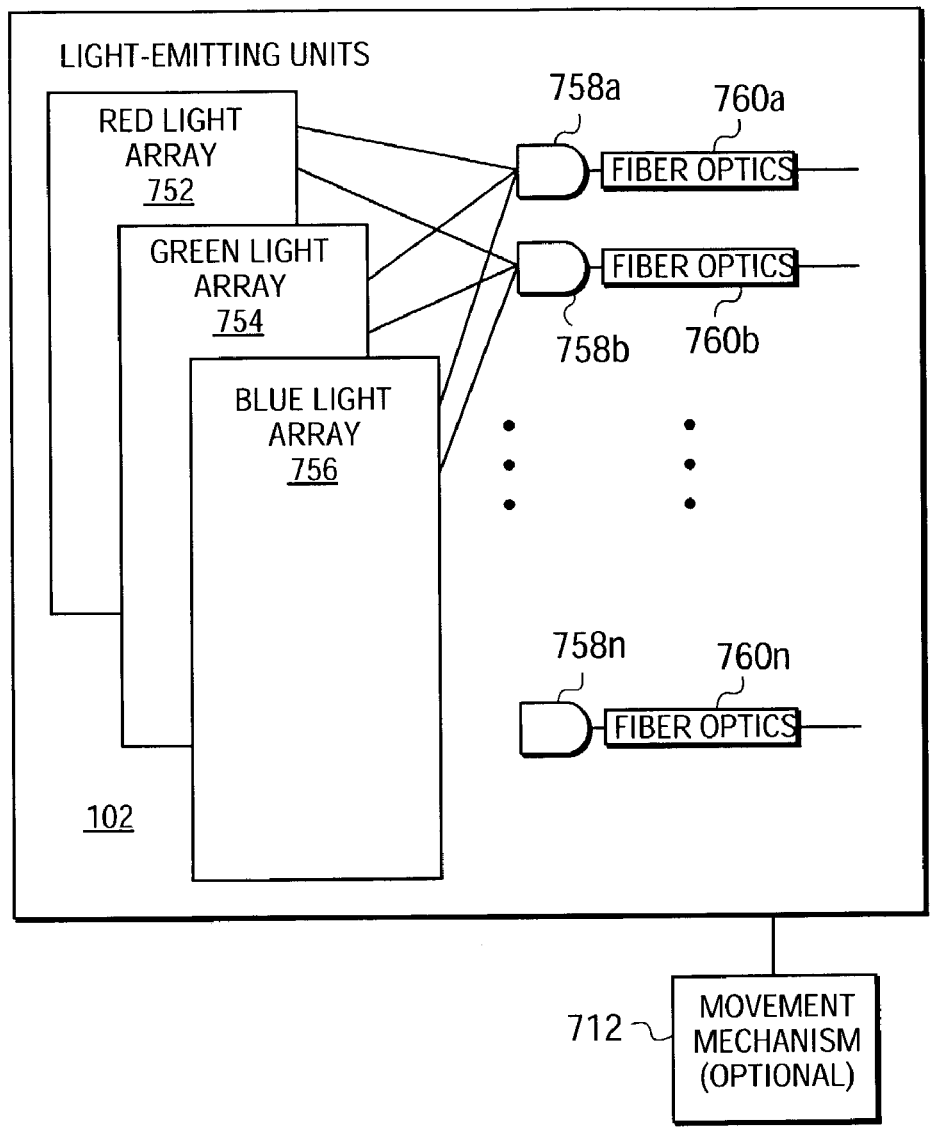

FIGS. 7A and 7B show in more detail the light-emitting units 102 of the projection system 100 of FIG. 1, according to an embodiment of the invention in which the light output by the units 102 is organized substantially along a first dimension of a two-dimensional plane and scanned along a second dimension of the plane. In FIG. 7A, the light-emitting units 102 include the light-emitting units 102a, 102b, . . . , 102n. The light-emitting unit 102a is specifically shown in detail, although the other light-emitting units 102b, . . . , 102n are similarly implemented. The light-emitting unit 102a includes one or more red light-emitting sources 702, one or more green light-emitting sources 704, and one or more blue light-emitting sources 706, emitting red light, green light, and blue light, respectively. The sources 702, 704, and 706 may be red LED's, green LED's, and blue LED's, respectively.

The light output by these sources 702, 704, and 706 is output to a beam former and director 708, which forms and directs a light beam composed of one or more of red light, green light, and blue light. The fiber optics 710 then positions this light beam relative to the light beams output by the other light-emitting units so that the light beams are organized substantially along the first dimension of the two-dimensional plane, as has been described. In the case where the light beams are organized in a sparse formation, such as that shown in FIG. 6D, an optional movement mechanism 712 may be present so that the light beams can be moved back and forth along the same dimension along which they are substantially organized. This movement mechanism 712 may be an optical mechanism, or another type of mechanism.

Thus, in the embodiment of FIG. 7A, light-emitting sources are organized into different groups corresponding to the light-emitting units 102a, 102b, . . . , 102n, where the light beams output by the units 102a, 102b, . . . , 102n are organized substantially along one of the dimensions of the two-dimensional plane for scanning across the plane along the other dimension. By comparison, in the embodiment of FIG. 7B, the light-emitting units 102 include a red light array 752, a green light array 754, and a blue light array 756. The light arrays 752, 754, and 756 output red light, green light, and blue light, respectively, and may be arrays of red LED's, green LED's, and blue LED's, respectively.

Each of the light arrays 752, 754, and 756 outputs light to the beam formers and directors 758a, 758b, . . . , 758n, as is specifically shown only in relation to the beam formers and directors 758a and 758b in FIG. 7B for illustrative clarity. The beam formers and directors 758a, 758b, . . . 758n form and direct light beams composed of one or more of red light, green light, and blue light. The light beams are then positioned by the fiber optics 760a, 760b, . . . , 760n so that they are organized substantially along the first dimension of the two-dimensional plane. As in FIG. 7A, where the light beams of FIG. 7B are organized in a sparse formation, an optional movement mechanism 712 may be present so that the light beams can be moved back and forth along the same dimension along which they are substantially organized.

The implementations of the light-emitting units 102 in FIG. 7A and FIG. 7B, however, do not change the basic operation of the scanning process employed. The light beams output by the units 102 in FIGS. 7A and 7B are organized along a first dimension of a two-dimensional plane, and are scanned across the second dimension of the plane. As the light beams are scanned across the plane's second dimension, the constituent red, green, and blue light of each beam are individually turned on and off, and their intensities optionally varied, by an image controller in accordance with the image provided by an image source. This results in the image being properly projected.

Figure 8:
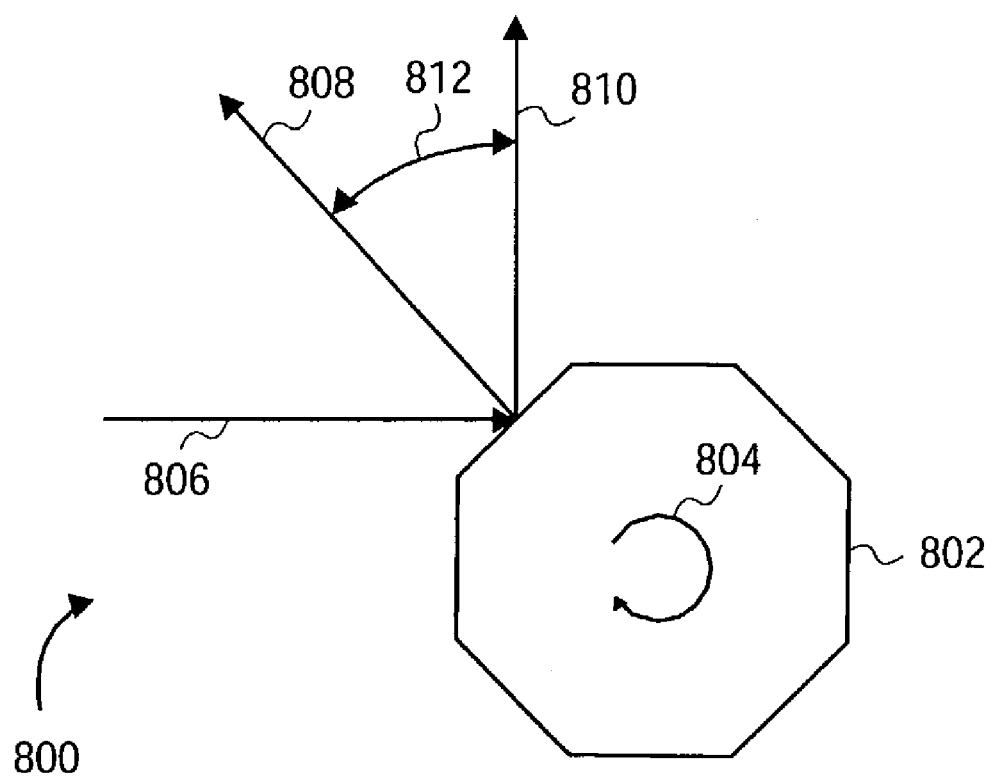
FIG. 8 is a diagram of the scanning optics of FIG. 1 according to an embodiment of the invention in which light beams are organized substantially along a vertical dimension of a two-dimensional plane and scan the plane along a horizontal dimension.

FIG. 8 shows in detail the scanning optics 108 of the projection system 100 of FIG. 1, according to an embodiment of the invention in which the light output by light-emitting units is organized substantially along a first dimension of a two-dimensional plane and scanned along a second dimension of the plane. In the diagram 800, the light beams 806 are organized along a dimension of the two-dimensional plane that is perpendicular to the plane of FIG. 8. A polygonal mirror 802, which is specifically shown as an octagonal mirror in FIG. 8, although the invention is not so limited, rotates as indicated by the arrow 804.

As the mirror 802 rotates, the light beams 806 are incident to a side of the mirror 802 at a varying angle. As a result, the light beams 806 are scanned over the second dimension of the two-dimensional plane, back and forth as the beams 808 to the beams 810, as indicated by the arrow 812. This scanning along the second dimension of the two-dimensional plane is accomplished each time the mirror 802 rotates such that the beams 806 are incident to another side of the mirror 802. Thus, the speed of the scanning of the light beams 806 is dependent on how fast the mirror 802 rotates and the number of sides the mirror 802 has.

Methods

Figure 9:
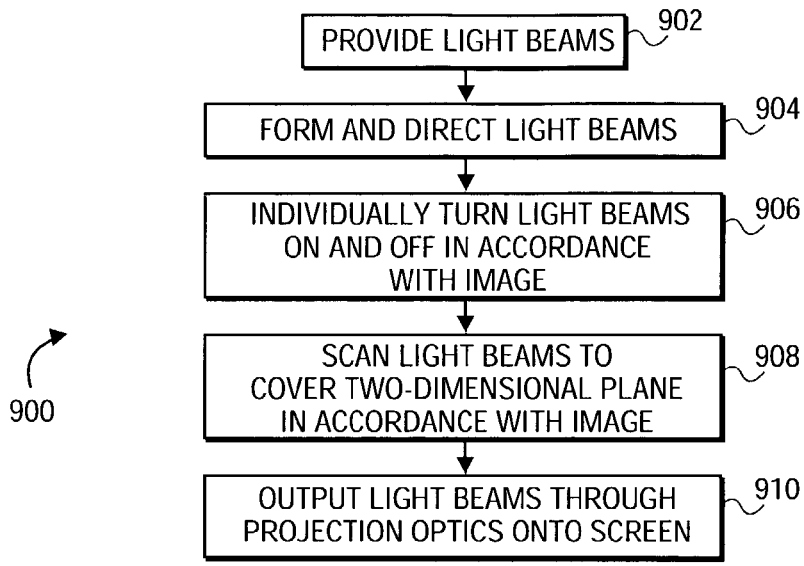
FIG. 9 is a flowchart of a method of use according to an embodiment of the invention.

FIG. 9 shows a method of use 900 according to an embodiment of the invention. The method 900 can be performed in accordance with the projection system 100 of FIG. 1, in accordance with either of the two specific embodiments that have been described in the previous two sections of the detailed description, and/or in accordance with another type of projector of projection system. First, a number of light beams are provided (902), and formed and directed (904). Each light beam may be made up of red light, green light, and blue light, such that the light beams are individually turned on and off in accordance with an image (906). For example, the constituent red light, green light, and blue light of each light beam may be individually turned on and off, or otherwise have their intensities individually varied.

The light beams are scanned to cover a two-dimensional plane in accordance with the image (908). For example, each light beam may be scanned over the two dimensions of a corresponding two-dimensional sub-region of the two-dimensional plane. As another example, the light beams may be organized substantially along one dimension of the two-dimensional plane, and scanned along the other dimension of the two-dimensional plane. Scanning optics are preferably employed to accomplish this scanning of the light beams. The light beams are finally output through projection optics and onto a screen for display (910).

Figure 10:
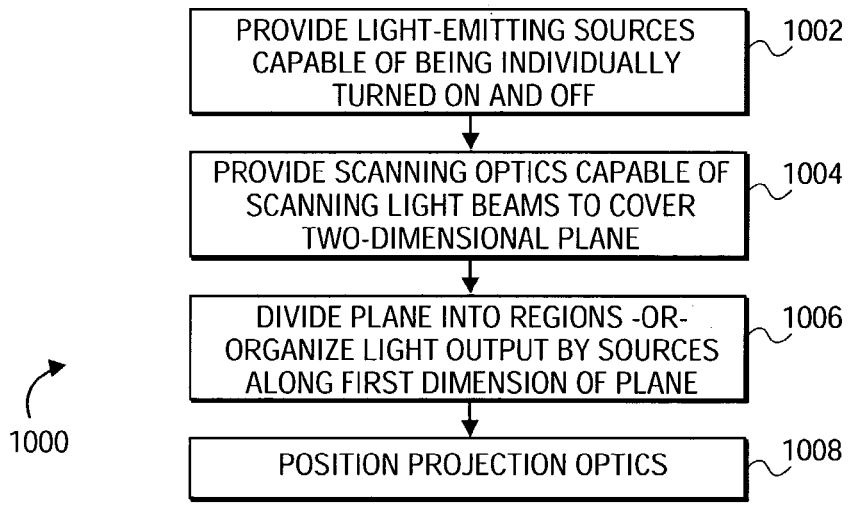
FIG. 10 is a flowchart of a method of manufacture according to an embodiment of the invention.

FIG. 10 shows a method of manufacture 1000 according to an embodiment of the invention. The method 1000 may be performed to implement the projection system 100 of FIG. 1, to implement either of the two specific embodiments that have been described, and/or to implement another type of projector or projection system. First, a number of light-emitting sources that are capable of being individually turned on and off in accordance with an image are provided (1002). The light-emitting sources may each include red, green, and blue light-emitting sources. Scanning optics that are capable of scanning light or light beams output by the light-emitting sources to cover a two-dimensional plane in accordance with the image are also provided (1004).

Next, either the two-dimensional plane is divided into overlapping or non-overlapping two-dimensional sub-regions that correspond to the light-emitting sources, or the light or light beams output by the light-emitting sources are organized along a first dimension of the plane (1006). In the former case, each light-emitting source is responsible for covering a corresponding sub-region of the plane, and is scanned in two dimensions by the scanning optics to completely cover the sub-region. In the latter case, the light-emitting sources are scanned by the scanning optics over the other dimension of the two-dimensional plane so that the plane is completely covered. Finally, projection optics are positioned for the light beams as scanned to pass through for projection onto a screen (1008).

Conclusion

It is noted that, although specific embodiments have been illustrated and described herein, it will be appreciated by those of ordinary skill in the art that any arrangement is calculated to achieve the same purpose may be substituted for the specific embodiments shown. For instance, whereas light sources have been described herein in relation to some embodiments of the invention as being able to be turned on and off, the invention is not so limited, and encompasses light sources that can have their intensities more generally varied. That is, that the intensities of light sources vary encompasses turning the light sources on and off. As another example, other applications and uses of embodiments of the invention, besides those described herein, are amenable to at least some embodiments. This application is intended to cover any adaptations or variations of the present invention. Therefore, it is manifestly intended that this invention be limited only by the claims and equivalents thereof.

We claim:

1. A projector comprising:
a plurality of light-emitting sources having intensities that are varied in accordance with an image, light output by the plurality of light-emitting sources organized in a sparse columnar formation substantially along a first dimension of a two-dimensional plane corresponding to the image; and,
scanning optics to scan light output by the plurality of light-emitting sources over a second dimension of the two-dimensional plane to cover the two-dimensional plane in accordance with the image,
wherein the light output by the plurality of light-emitting sources is movable in unison along the first dimension of the two-dimensional plane to compensate for gaps within the sparse columnar formation.

2. The projector of claim 1, wherein the plurality of light-emitting sources is organized into a plurality of groups, each group comprising at least one red light-emitting source emitting red light, at least one green light-emitting source emitting green light, and at least one blue light-emitting source emitting blue light, the light emitted by the plurality of groups organized substantially along the first dimension of the two-dimensional plane.

3. The projector of claim 2, further comprising a beam former and director to form the red light, the green light, and the blue light of each group into a single beam and the intensities of which are individually varied in accordance with the image.

4. The projector of claim 2, further comprising a controller to vary intensities of the red light, the green light, and the blue light output by each unit individually in accordance with the image as the scanning optics scans the red light, the green light, and the blue light over the second dimension to cover the two-dimensional plane.

5. The projector of claim 1, further comprising:
projection optics to project the light in accordance with the image outward from the projector; and,
a controller to vary the intensities of the plurality of light-emitting sources in accordance with the image.

6. The projector of claim 1, wherein each light-emitting unit comprises fiber optics to route the light output by the light-emitting unit for organization with the light output by other of the plurality of light-emitting units substantially along the first dimension of the two-dimensional plane in the one of the staggered formation and the sparse columnar formation.

7. The projector of claim 1, wherein the scanning optics comprises a rotatable polygonal mirror to scan the light output by the plurality of light-emitting units over the second dimension to cover the two-dimensional plane.

8. The projector of claim 1, wherein each of the plurality of light-emitting sources comprises a light-emitting diode (LED) having a particular color.

9. The projector of claim 1, wherein the intensities of the plurality of light-emitting sources are varied by turning the plurality of light-emitting sources on and off in unison.

10. A system comprising:
means for emitting light having an intensity varied in accordance with an image and for organizing the light in a sparse columnar formation substantially along a first direction of a two-dimensional plane corresponding to the image; and,
means for scanning the light over a second dimension of the two-dimensional plane to cover the two-dimensional plane in accordance with the image,
wherein the light output is movable in unison along the first dimension of the two-dimensional plane to compensate for gaps within the sparse columnar formation.

11. The system of claim 10, further comprising means for forming red light, green light, and blue light emitted by the means for emitting light into a plurality of single beams.

12. The system of claim 10, further comprising:
projection optics to project the light in accordance with the image outward from the projector; and,
a controller to vary the intensity of the means for in accordance with the image.

13. A method for performance in conjunction with a projector comprising:
organizing a plurality of light beams substantially in a sparse columnar formation along a first dimension of a two-dimensional plane corresponding to an image;
varying intensities of the plurality of light beams individually in accordance with an image;
scanning the plurality of light beams over a second dimension of the two-dimensional plane to cover the two-dimensional plane in accordance with the image; and,
moving the plurality of light beams in unison along the first dimension of the two-dimensional plane to compensate for gaps within the sparse columnar formation.

14. The method of claim 13, wherein varying the intensities of the plurality of light beams individually comprises turning the plurality of light beams on and off individually.

15. The method of claim 13, farther initially comprising, for each light beam, forming and directing red light, green light, and blue light as the light beam.

16. A method for performance in conjunction with a projector comprising:
providing a plurality of light-emitting sources having intensities capable of being individually varied in accordance with an image;
organizing the plurality of light-emitting sources such that light output by the plurality of light emitting sources is in a sparse columnar formation substantially along a first dimension of a two-dimensional plane corresponding to the image;
providing scanning optics capable of scanning light output by the plurality of light-emitting sources over a second dimension of the two-dimensional plane to cover the two-dimensional plane in accordance with the image; and,
moving the light output by the plurality of light-emitting sources in unison along the first dimension of the two-dimensional plane to compensate for gaps within the sparse columnar formation.

17. The method of claim 16, wherein providing the plurality of light-emitting sources having the intensities capable of being individually varied comprises providing the plurality of light-emitting sources capable of being individually turned on and off.

18. The method of claim 16, wherein providing the plurality of light-emitting sources comprises providing at least one red light-emitting source, at least one green light-emitting source, and at least one blue light-emitting source.

19. The method of claim 18, further comprising providing a beam former and director to form red light, green light, and blue light emitted by the at least one red light-emitting source, the at least one green light-emitting source, and the at least one blue light-emitting source into at least one single beam.

* * * * *

UNITED STATES PATENT AND TRADEMARK OFFICE
CERTIFICATE OF CORRECTION

| | | |
|---|---|---|
| PATENT NO. | : 7,164,451 B2 | Page 1 of 1 |
| APPLICATION NO. | : 10/419321 | |
| DATED | : January 16, 2007 | |
| INVENTOR(S) | : Winthrop D. Childers et al. | |

It is certified that error appears in the above-identified patent and that said Letters Patent is hereby corrected as shown below:

In column 10, line 39, in Claim 15, delete "farther" and insert -- further --, therefor.

Signed and Sealed this

Thirtieth Day of December, 2008

JON W. DUDAS
*Director of the United States Patent and Trademark Office*